United States Patent [19]

Rosza

[11] Patent Number: 4,468,141
[45] Date of Patent: Aug. 28, 1984

[54] CHARACTER GENERATOR
[75] Inventor: Kalman Rosza, Järfälla, Sweden
[73] Assignee: Facit Aktiebolag, Åtvidaberg, Sweden
[21] Appl. No.: 413,363
[22] PCT Filed: Dec. 14, 1981
[86] PCT No.: PCT/SE81/00370
   § 371 Date: Aug. 18, 1982
   § 102(e) Date: Aug. 18, 1982
[87] PCT Pub. No.: WO82/02269
   PCT Pub. Date: Jul. 8, 1982
[30] Foreign Application Priority Data
   Dec. 19, 1980 [SE] Sweden ............... 8009036
[51] Int. Cl.³ ............... B41J 3/12
[52] U.S. Cl. ............... 400/124; 101/93.05; 400/121
[58] Field of Search ............... 400/121, 124; 101/93.04, 93.05; 340/723, 745, 750; 382/56

[56] References Cited
U.S. PATENT DOCUMENTS
4,187,552 2/1980 Verstegen ............... 400/124 X FOREIGN PATENT DOCUMENTS
56081 7/1982 European Pat. Off. ............ 400/121

OTHER PUBLICATIONS
*IBM Tech. Disc. Bulletin*, by G. L. Douglas, vol. 19, No. 8, Jan. 1977, pp. 2851-2852, 400-121.

Primary Examiner—Paul T. Sewell
Attorney, Agent, or Firm—Burns, Doane, Swecker & Mathis

[57] ABSTRACT

A character generator for generating characters which are transferred to a recording medium by a dot-matrix print head. In the character generator there is stored for each character the information required for the activation of the printing needles of the print head. The information comprises two parts, one of which contains a length description, i.a. indicating the total length of the character, and an address to the memory area in which the second part of the information is stored, the said second part constituting the graphic representation of the character. The first part of the information for all characters comprises four bytes while the second part of the information occupies a memory area adapted to the length of the character.

5 Claims, 11 Drawing Figures

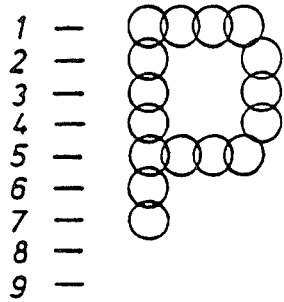
Fig.1
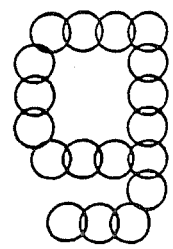
Fig.2
Fig. 3 PRIOR ART
Fig. 4 PRIOR ART

CHARACTER GENERATOR

The present invention pertains to a character generator of the kind having nine printing needles arranged in a column.

One application of a character generator is in matrix printers wherein it is used to generate the character information required for the printing needles of the printer to be able to build up different characters. Every such character consists of a number of dots in a N×M matrix. Normally, the height of the matrix is seven or nine dots while the width is determined by the horizontal resolution and may vary between 10 and 25 dots.

In the character generator there is stored either the specific character together with the interspace to the following character or just the character. In the latter case the interspace is formed by use of an algorithm. The character image is stored in a memory area, the start address of which is generated by a code, for instance the ASCII-code representing the said character. For example, the area may comprise 14 bytes of which 8 bytes represent the character and 6 bytes represent the interspace. In the example referred to the character requires seven printing needles. However, some characters require nine needles which causes problems because each byte contains at a maximum eight bits, each of which represent one needle. Hence, the memory area of the character must be enlarged and the easiest way is to reserve a separate byte for the ninth needle. Another possibility is to designate to one byte the ninth needle information relating to eight consecutive columns.

The following drawbacks are connected with the character generator disclosed above.

1. The memory area is always the same, even for characters that are very narrow.
2. The interspace between characters occupies needless space in the memory. However, this drawback may be eliminated if the interspace is generated by means of an algorithm.
3. Those bytes which contain only noughts frequently recur and they contain no information other than that no dot is to be printed in the specific column.
4. The drawback referred to under point 3 will be still more important in printers designed for multi-pass printing, i.e. wherein the print head passes the same line more than once. Usually, during the second, third etc. passes the character generator contains up to 70-80% bytes comprising only noughts.
5. A few characters, such as g, j, y, etc., require a ninth needle. There are several methods available for storing the ninth needle information, all of them, however, having the disadvantage that all characters reserve memory area for the ninth needle, while just a few actually use the area reserved.
6. Certain character repertoires comprise characters of varying length. Either these characters have to be treated separately or the memory area in the character generator must be determined by the character of the greatest length.
7. Proportional spacing requires separate treatment of the characters, in order that not the character pitch but the character interspace, i.e. the distance between two consecutive characters, be invariable.

The object of the invention is to provide a character generator in which the drawbacks referred to above have been eliminated. The object is achieved in a character generator having the features included in the appending claims.

A more detailed description of the invention will be given below in connection with an embodiment with reference to the accompanying drawings in which FIGS. 1 and 2 show the characters "P" and "g", respectively, printed by means of a dot-matrix print head.

FIG. 3 shows the information to be stored in the character generator to represent the character of FIG. 1. As FIG. 3, FIG. 4 shows the information to represent the character of FIG. 2.

Figure 5:
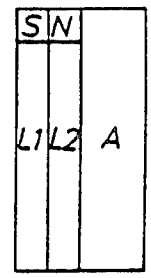
FIGS. 5 and 6 show the arrangement of the character information in a character generator according to the invention.
Figure 6:
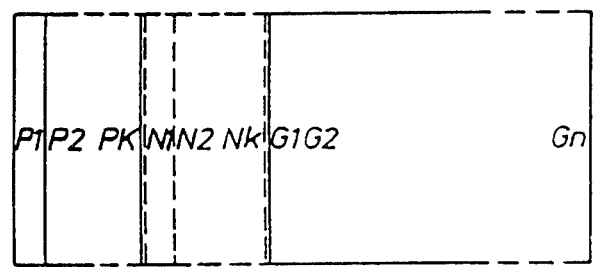
Figure 7:
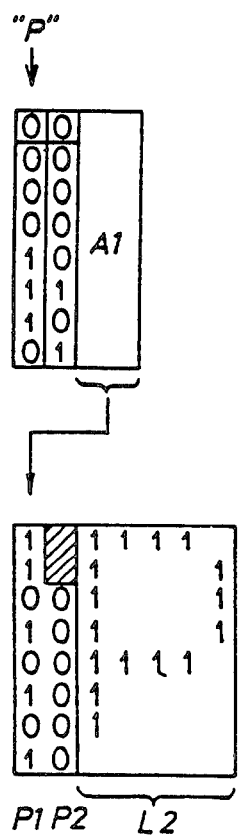
Figure 8:
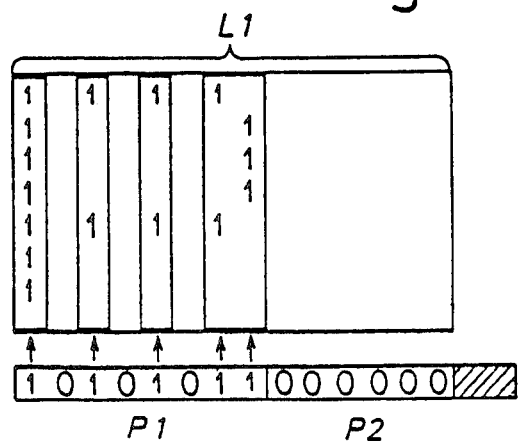
Figure 9:
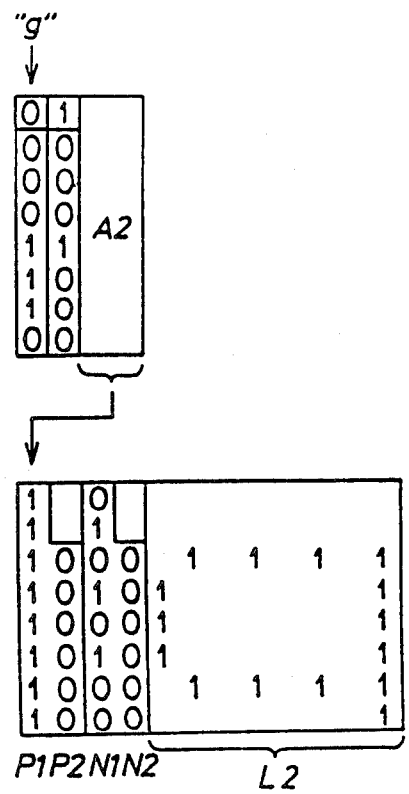
Figure 10:
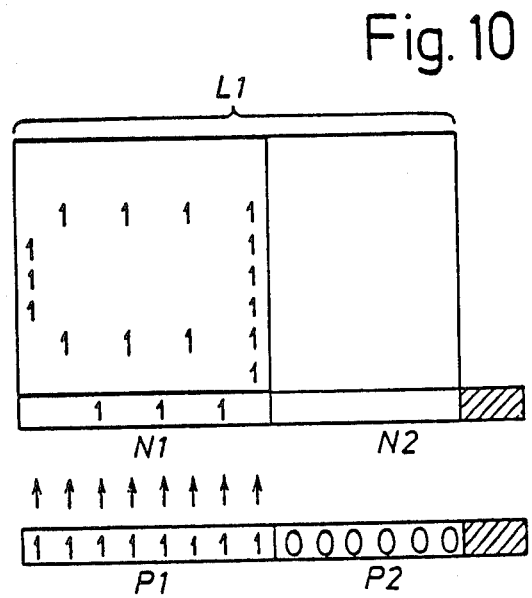

FIGS. 7 and 8 more in detail show the arrangement of the character information according to FIGS. 5 and 6 with reference to the character "P". In the same way, FIGS. 9 and 10 show the character information of FIGS. 7 and 8 with reference to the character "g".

Figure 11:
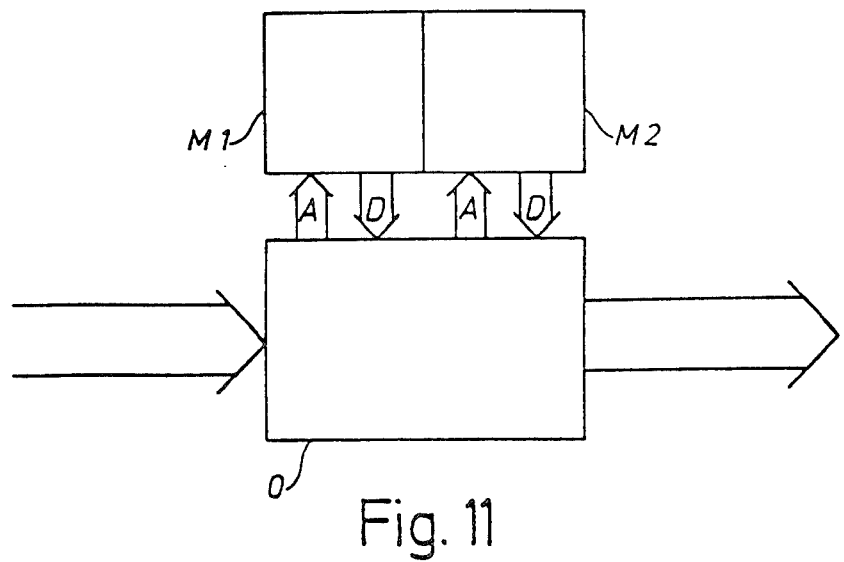

FIG. 11, finally, is a block diagram of the character generator.

The following description of the embodiment will be given with reference to the characters "P" and "g". In FIG. 1 the letter "P" is shown as printed by a dot-matrix print head comprising nine printing needles. The positions of the needles have been indicated by lines numbered 1-9 in a vertical row. Above the letter, the columns have been indicated in which the printing needles are activated. These columns have been numbered 1-14. The letter "g" is correspondingly illustrated in FIG. 2.

FIG. 3 shows the arrangement, known per se, of the information relating to the character "P" in the character generator. As appears from FIG. 1, the letter "P" requires seven needles and at least one needle is to be activated in the columns 1, 3, 5, 7 and 8. This is reflected in FIG. 3 wherein the positions in which a needle is to be activated have been marked by "1". The information is collected in bytes and one byte is reserved for each column. In each byte the activated needle is represented by a "1" and the non-activated needle by a "0". For the character "P" 14 bytes are reserved, 8 bytes for the character and 6 bytes for the interspace to the following character.

The character representation shown in FIG. 4 refers to the letter "g". As appears from FIG. 2 this character requires nine printing needles and since a byte comprises eight bits representing eight needles, two bytes have to be assigned to each column. In the Figure this has been indicated by 14 compartments being provided, each representing one column and comprising two bytes. The left byte in the respective compartment represents the needles 1-8 while the right byte represents the ninth needle.

The above description with reference to FIGS. 1-4 is an illustrative example of the prior art which shows that memory area has to be reserved for information that is used to an extent much less than would correspond to the memory area assigned to it. In the following there will be described a character generator according to the invention by which it will be possible to save memory area with unchanged performance.

The information in the character generator comprises two parts of which a length information is shown in FIG. 5 and a graphic information in FIG. 6. The first part, the length information, always consists of four bytes and is addressed by the ASCII-code representing the respective character. In FIG. 5 the following abbreviations have been used:

S if S=1 The character is to be treated separately (for instance a marking may be made as to national variants).

L1 1-127 Indicates the total length of the character (character+interspace), at maximum 127 columns.

N if N=1 Memory area to be reserved for the ninth needle.

L2 0-127 Indicates the number of information containing columns of the character. L2=L1 minus the number of columns containing only noughts.

A OOOO-FFFF A 16-bit address to the graphic part of the character generator wherein the compressed representation of the character is stored.

In the graphic part, as shown in FIG. 6, each character is represented by a memory area of varying size. The following description refers to FIG. 6.

P1,P2 ... Pk This area indicates the empty columns of the character, i.e. columns in which no needles are to be activated. Each byte describes eight columns of the character, and P1 describes the first eight columns, P2 the following group of eight columns etc. In the usual way "1" indicates a column in which needles are to be activated while "0" indicates an empty column. The coefficient k in Pk is calculated according to the following rule:

k=1 if $0 < L1 \leq 8$
k=2 if $8 < L1 \leq 16$
k=3 if $16 < L1 \leq 24$ etc.

N1,N2 ... Nk This area only exists in case the ninth needle is needed, i.e. if N=1, see the length information. Each bit indicates the presence of needle 9 in the actual column. For the calculation of k in Nk the same rule as for Pk is applicable.

G1,G2 ... Gn This area contains only the columns in which needles are to be activated and thus constitutes the compressed representation of the character. For the index n in Gn the relationship n=L2 applies.

The representation of the letter "P" in the character generator according to the invention as illustrated in FIGS. 7 and 8. At the top of FIG. 7 the first part of the information in the character generator is shown. A comparison with FIGS. 1, 3, and 5 shows the following to be valid for the letter "P".

S=0 No separate treatment.
L1=14 Corresponds binary to 000 1110.
N=0 No needle No. 9.
L2=5 Corresponds binary to 000 0101.

In A1 a 16-bit address will be found for the memory area containing the graphic representation of the character. In this memory area information is stored relating to the columns bearing information (1) and to the empty columns (0) respectively. This information is represented by columns P1 and P2. The compressed graphic representation of the letter "P" is to be seen in the area G1 wherein all columns which contain information are arranged in sequence. As appears from FIG. 8 the information required for the generation of needle activating signals is derived by combination of P1, P2, L1, L2 and G1.

In FIGS. 9 and 10 there is shown the representation of the letter "g" in the character generator. For this letter the following is valid:

S=0 No separate treatment.
L1=14 Corresponds binary to 000 1110.
N=1 Reservation to be made for needle No. 9.
L2=8 Corresponds binary to 000 1000.

In A2 a 16-bit address is to be found for the memory area storing the graphic picture of the letter "g". In this area P1 indicates that all columns in the character contain information, i.e. at least one needle is to be activated in all columns. P2 indicates the interspace in number of columns to the following character. N indicates that the ninth needle is to be activated in at least one of the columns. G1 indicates the compressed representation of the letter "g" for eight of the needles in each column. By combination of L1, L2, N1, N2, P1, P2, and G1, as schematically indicated in FIG. 10, the information required for the generation of the needle activating signals may be derived.

In comparison to the prior art, the character generator according to the invention gives a saving in memory area which with respect to the letter "P" amounts to three bytes (11 bytes to 14) and for the letter "g" amounts to 12 bytes (16 bytes to 28). In prior art character generators for each character a memory area of the same size must be reserved. Contrary hereto in the character generator in accordance with the invention only the length information has the same area for all characters, while the graphic representation of a character only requires the memory area in bytes that corresponds to the compressed representation of the character, i.e. the number of information carrying columns, and for those characters concerned, information relating to the ninth needle.

With reference to FIG. 11 there will now be schematically described how information is taken out from the character generator and converted into needle activating signals. For this purpose a converter O is provided which is connected to two memories M1 and M2 via address lines A and data lines D. The converter in the embodiment described, being the CPU of a microprocessor, has an input on which is applied a print order for a character, the print order being in the form of a code, viz. a seven bit ASCII-code. The converter also has an output on which needle activating signals are emitted in the shape of a nine bit code. On the data line eight bits are transferred simultaneously while the address line conveys 16-bit addresses.

A print order for the letter "P" is represented on the input of the converter by the hexadecimal number 50 H which is the ASCII-code assigned to this letter. The converter converts the 50 H-code into an address (A) which is stored in the address register of the converter and points at the length information L1 for the letter "P" in memory M1. The most significant bit in L1, previously designated S (FIG. 5), is examined and found to be "0". Hence, no separate treatment will be needed for the character "P". The examination proceeds with the seven least significant bits of L1 and the seven bits are 000 1110, which correspond to the decimal number 14. This number indicates the width of the character to be 14 columns including the interspace (L1=14).

Then the address register is increased by 1 to point at L2 of the letter "P". The most significant bit of L2, which is N, is examined. In the example also N=0 which indicates that no "needle 9" information is included in the graphic part of the character information. The seven least significant bits of L2 are 000 0101 which correspond to the decimal number 5 indicating that in five columns, at least one needle is to be activated. In other words, the graphic part, G, comprises five bytes. Then the number of empty columns, i.e. columns in which no needles are to be activated, will be 14−5=9.

Now the address register is increased by 1 and 2, respectively, to point at the address of the least and the most significant half, respectively, of the 16-bit address which occupies two bytes after L2. The address is used by the converter as a pointer for the memory M2, i.e. the address register points at P1 of the letter "P" in memory M2. From now on the converter is working in M2. As L1=14, two bytes P1 and P2 are required in the P area, see FIG. 6. Eight bits in P1 and 6 bits in P2 will be used, compare FIG. 7. Now the converter know that the G area follows on P2 because N=0 (N area is missing). P1 is examined bit by bit and the least significant bit corresponds to the first column, the second bit to the second column, etc. Upon finishing the examination of P1, P2 will be examined, the least significant bit of which corresponds to the ninth column, etc. The least significant bit relating to the letter "P" is "1". That means that G1 gives the first needle information binary corresponding to 1111 1110. The second bit of P1 is "0" which means that the second column of "P" has no needle information. The third bit of P1 is "1" resulting in G2 giving the next needle information (in binary form 1000 1000). The remaining bits of P1 are examined in the same way.

With reference to the letter "P" all of the bits of P2 are "0" which means that no needles are to be activated in the character interspace. The two most significant bits of P2 will not be examined because of the indication by L1 that the character comprises 14 columns.

In case the character "P" is to be written in opposite direction, i.e. from the right to the left, the procedure must be slightly modified. Accordingly the examination starts with the sixth bit of P2 followed by bit 5, bit 4 etc. Then the eighth, seventh bit, etc. of P1 will be examined. In this case L2 is used to indicate that the needle information relating to the first column, as counted from the right, will be found in G5 (L2=5). The following needle information is to be found in G4 etc.

The presence of the "needle 9" information is indicated by N=1 which means that the N area is of the same size as the P area. As L1=14 two bytes are required in the P area as well as in the N area (P1, P2 and N1, N2, respectively). The converter now knows that the G area succeeds to N2 because N=1 (N area exists).

With reference to the representation of the letter "g" according to FIGS. 9 and 10 there will be indicated below the deviations caused by the demand for the "needle 9" information. N1=1 means that the N area is of the same size as the P area. Because L1=14 two bytes will be required in the P area as well as in the N area (P1, P2 and N1, N2, respectively). The converter now knows that the G area follows N2 as N=1 (N area exists). The least significant bit of P1 is 1 which means that the eight bits in G1 together with the first bit of N1 give the needle information relating to the first column (G1=0001 1100; first bit of N=0). The second bit of P1=1 which means that the eight bits of G2 together with the second bit of N1 give the needle information relating to the second column (nine bits). The third bit of P1=1 which means that the eight bits of G3 together with the third bit of N1 give the needle information relating to the third column.

As a summary, the following advantages may be achieved by the character generator according to the invention:

(1) The size of the memory area is adapted to the length of the character.
(2) The character interspace, if at all included in the character generator, is stored in compressed form.
(3) "Empty columns" in which no needles are to be activated do not occupy any memory area.
(4) Very wide characters, up to 127 columns, may be stored.
(5) Needle No. 9 may be included in arbitrary characters.
(6) Space for the ninth needle information does not need to be unnecessarily reserved.
(7) Proportional spacing does not require separate treatment as far as the character generation is concerned.
(8) The same graphic information can be addressed from different length descriptions offering advantages in connection with multi-pass writing wherein different characters may have identical representations in the character generator for the second, third, etc. passes.

I claim:

1. A character generator for a dot matrix printing head of the type having at least nine printing needles in a column, comprising:

a first memory unit containing information for each character relating to (a) the total number of columns corresponding to the length of the character, (b) the number of such columns in which printing needles are to be activated, and (c) whether the ninth printing needle is to be activated for the character;

a second memory unit storing a graphic representation of the characters and having, for each character, a first section containing a number of information bits corresponding to the number of columns in the character with each information bit indicating whether a needle is to be activated in an associated column, a second section containing information on which of the first eight printing needles of the printing head are to be activated in each column identified in the first section as having an activated needle, and a third section having a number of information bits equal to the number of information bits in said first section when information (c) in the first memory unit indicates that the character requires a ninth needle, the information bits in said third section identifying the columns of the character in which the ninth needle is to be activated; and means for reading the information stored in said first and second memory units and applying it to the printing head.

2. The character generator of claim 1 wherein said reading means addresses the information stored in said first memory in response to an input code indicating a particular character to be printed.

3. The character generator of claim 1 wherein the information stored in said first memory unit is contained in four bytes for each character, with a first one of said bytes containing information (a), a second one of said bytes containing information (b), and the two remaining bytes identifying the address in said second memory unit of the information relating to the graphic representation of the character.

4. The character generator of claim 3 wherein one of said first and second bytes also contains information (c).

5. The character generator of claim 3 wherein one of said first and second bytes also contains information indicating whether the character is to be treated separately.

* * * * *